Jan. 22, 1963  H. B. HUNTRESS  3,074,152
POWDER METALLURGY
Filed April 11, 1957  4 Sheets-Sheet 1
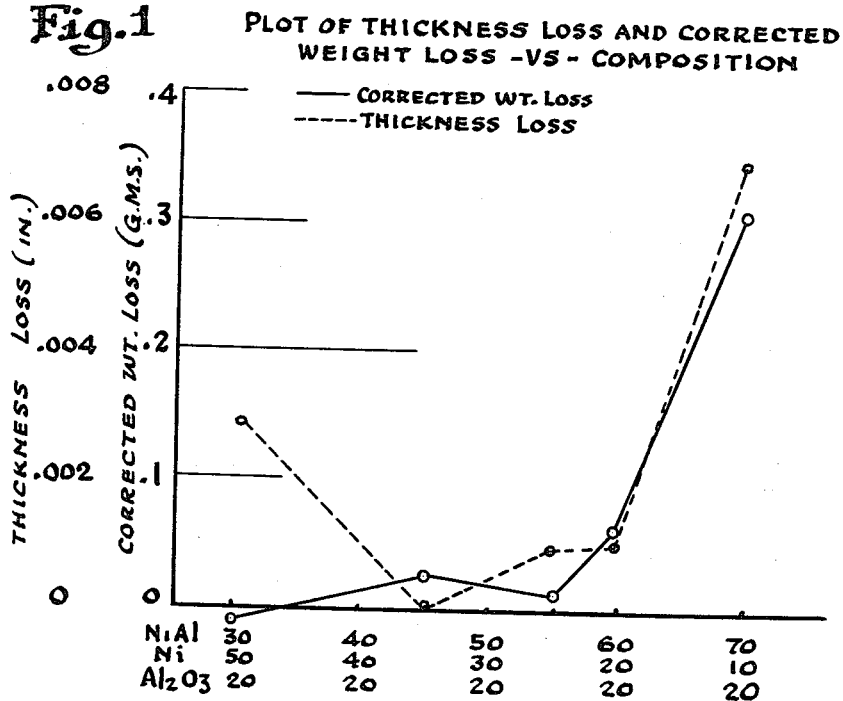
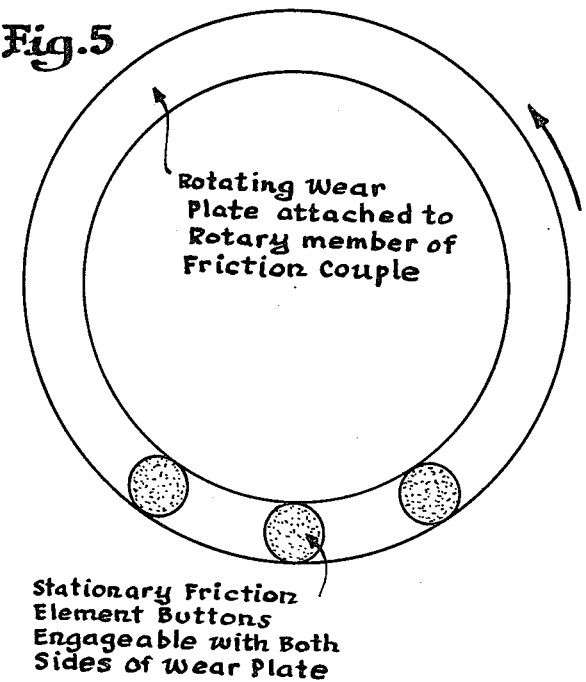
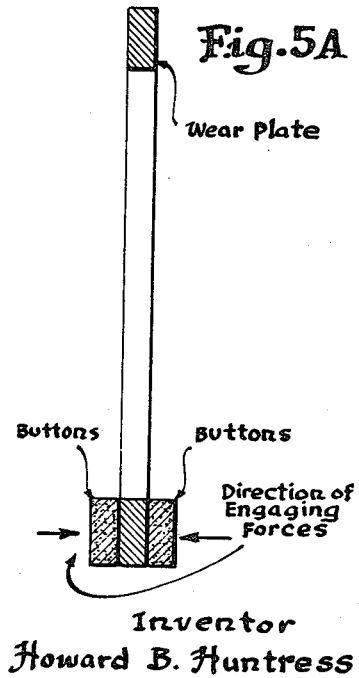
Inventor
Howard B. Huntress
By Wallace and Cannon
Attorneys

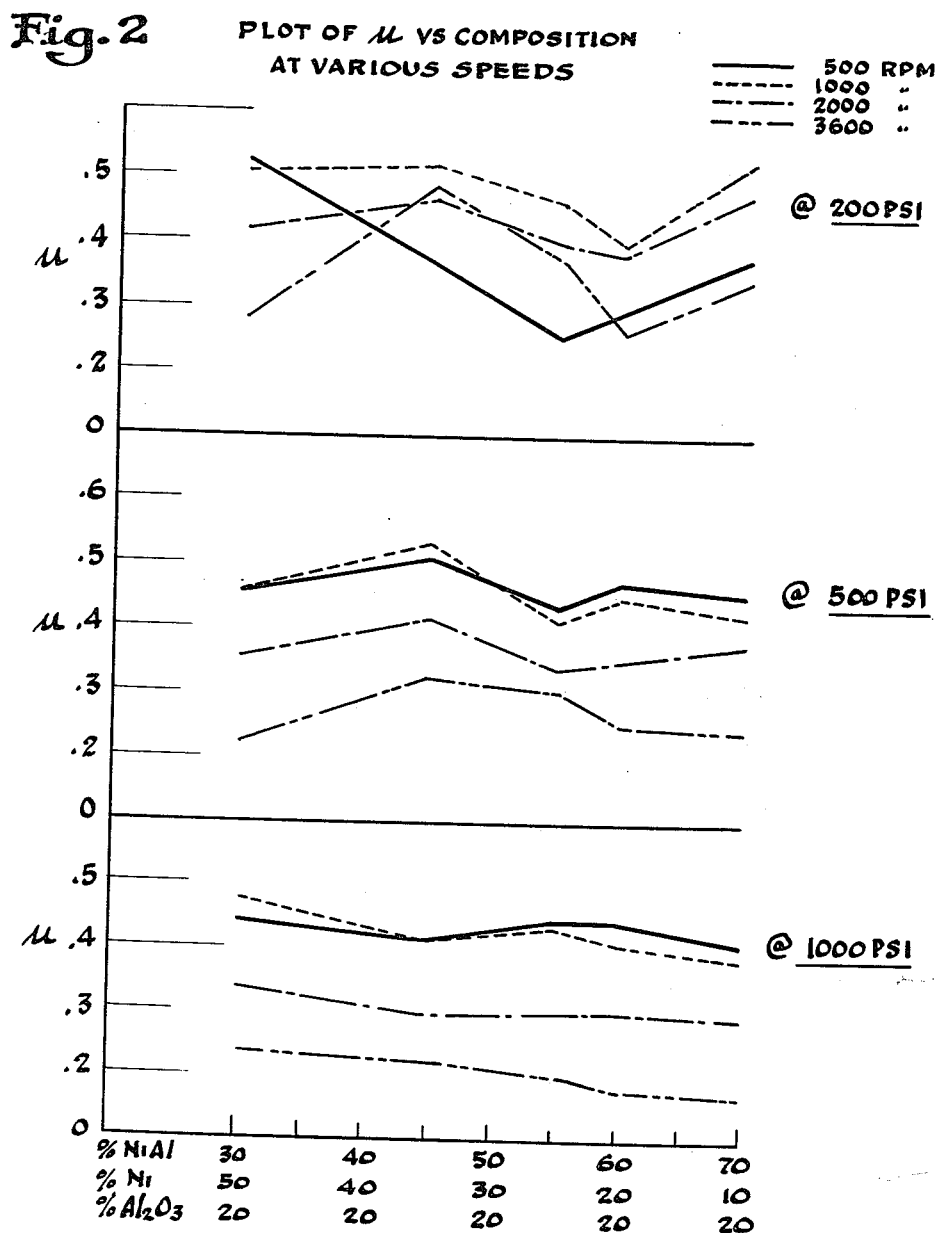

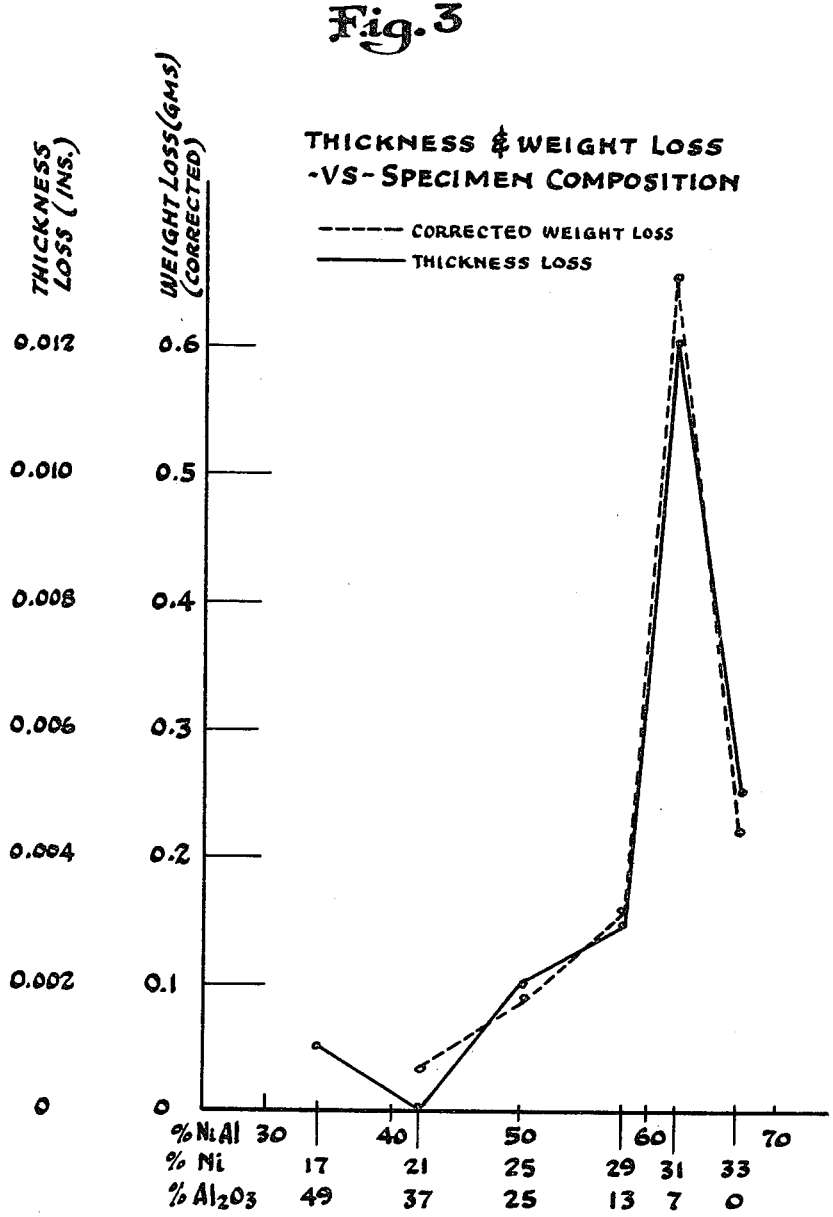

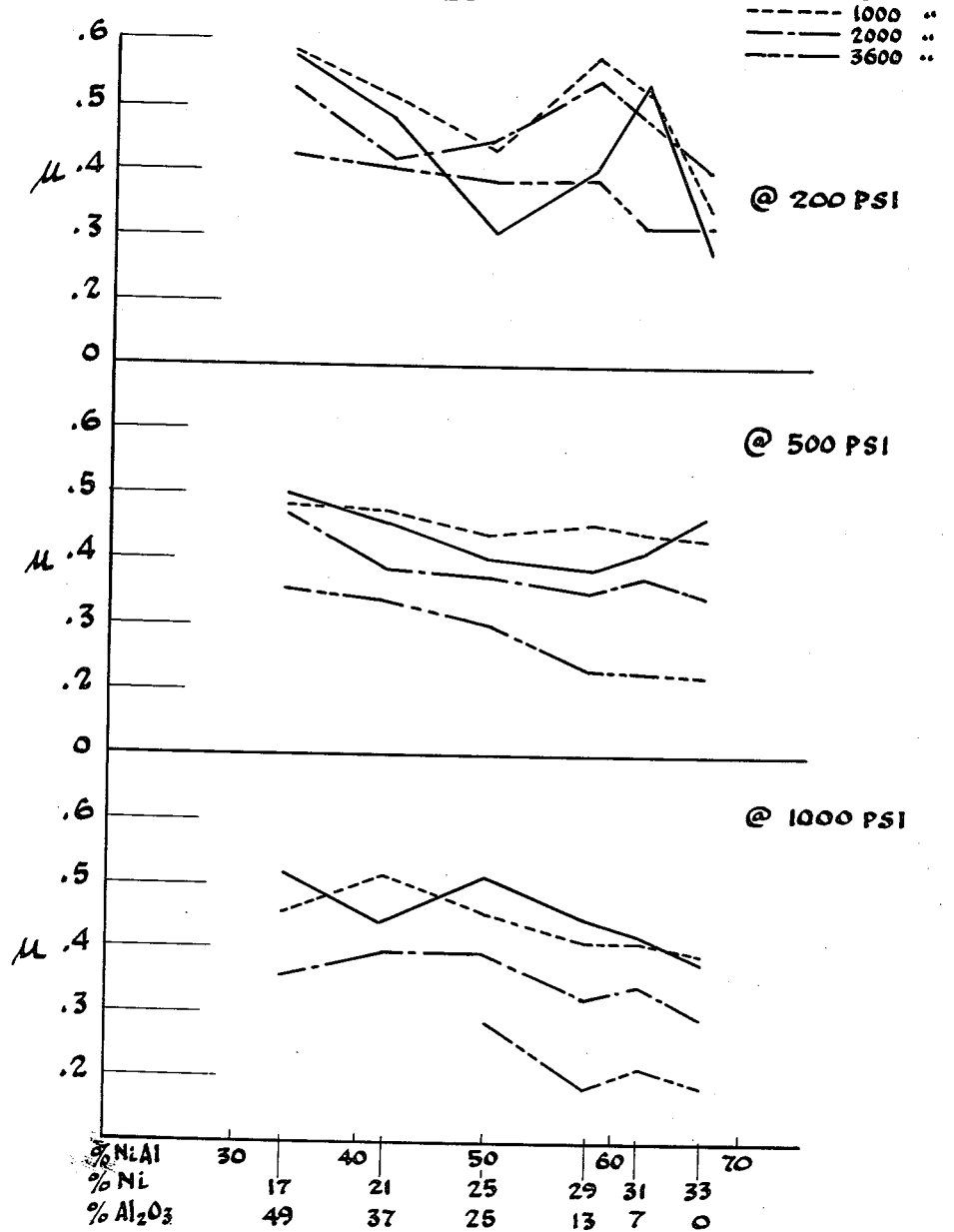

3,074,152
POWDER METALLURGY
Howard B. Huntress, Suffern, N.Y., assignor to American Brake Shoe Company, New York, N.Y., a corporation of Delaware
Filed Apr. 11, 1957, Ser. No. 652,130
7 Claims. (Cl. 29—182.3)

This invention relates to wear parts or elements that are to be resistant to wear and thermal shock such as metallic friction elements or the like.

Energy levels of the kind encountered in braking automotive vehicles, busses and the like can be absorbed quite satisfactorily by conventional composition brake linings of an organic bond type such as those composed of asbestos fibers or the like and an organic binder. Composition materials of this same general kind are also often used as clutch facings for effectively transmitting torque energy.

There are exceptional instances, however, where the energy to be dissipated or transmitted during braking or clutching is too extreme to be handled satisfactorily by conventional or unmodified molded organic-type composition material and would cause rapid deterioration of a friction element of this kind.

To remedy this, composition friction material for certain types of aircraft has been modified to include heat resistant mineral and metal content. However, not only have these heat resistant requirements continued to increase recently due to higher and higher aircraft landing speeds, but in some instances the space limitations of multiple disc aircraft brakes have necessitated very thin friction segments.

An instance of such severe requirements occurs in braking intercontinental military aircraft, where the friction element used for braking is subjected to severe and sudden torque and sudden very high temperatures induced by friction between the engaging parts of the brake couple, and the present invention is concerned primarily with the problems presented by exceptionally high energy levels or wear tendencies at which friction elements such as brake linings or like wear surfaces in a friction couple or like structure embodying wear parts may sometimes be required to work.

The primary object of the present invention is to enable a friction element or the like to operate satisfactorily at high energy levels, and to accomplish this specifically by composing the friction element at least in part of an inter-metallic compound capable of operating effectively at exceedingly high temperatures without objectionable thermal softening, physical failure or undue wear. Other objects of the present invention are, where required, to enhance resistance to mechanical shock by resort to a metallic binder for the intermetallic, and to impart further thermal shock resistance characteristics to the intermetallic by addition of a binder metal and/or a hard refractory ceramic such as mullite (aluminum silicate), alumina, silicon carbide and the like that would generally be classified as hard ceramic abrasives. Additionally, some graphite may be used for desirably reducing harshness of friction engagement.

Other and further objects of the present invention will be apparent from the following description which, by way of illustration, sets forth preferred embodiments of the present invention and the principles thereof and what I now consider to be the best mode in which I have contemplated applying those principles. Other embodiments of the invention embodying the same or equivalent principles may be used and changes may be made as desired by those skilled in the art without departing from the present invention and the purview of the appended claims.

In the drawings:

FIG. 1 sets forth curves on wear data for compositions of the present invention in which the intermetallic-to-binder ratio varies;

FIG. 2 sets forth curves on friction data at various speeds for compositions of the present invention in which the intermetallic-to-binder ratio varies;

FIG. 3 sets forth curves on wear data for compositions of the present invention in which the percentage of ceramic varies;

FIG. 4 sets forth curves on friction data for compositions of the present invention in which the percentage of ceramic varies; and FIGS. 5 and 5A are schematic views of a typical friction couple of the kind contemplated by the present invention.

I have found that friction elements or like wear parts composed of intermetallic compounds in so-called powdered metal form, pressed and incipiently fused, are capable of operating effectively at high energy levels of which the energy levels encountered in braking intercontinental military aircraft are typical. There are circumstances where a friction element of this kind may possibly be composed entirely of the pure intermetallic in the form of very thin strips welded to a ferrous metal backing member, but there are other circumstances where it is desirable to enhance the ability of the intermetallic to withstand high thermal and mechanical shock or wear while affording good frictional stability, and I have further found that these desirable characteristics can be attained by the addition to the intermetallic of a binder metal and a ceramic as will be described.

In producing an intermetallic wear element such as a friction element in accordance with the present invention, the separate metal components required to produce the intermetallic compound are first combined in powdered form in the proper stoichiometric ratio, homogeneously mixed, and reacted in an induction furnace in a helium atmosphere to produce the intermetallic compound by molecular reaction. The reacted intermetallic compound is cooled, next comminuted and may then be mixed with a powdered binder metal, or powdered ceramic or both as will be described, and the mixture hot pressed in a graphite die under pressures of from 1000 to 3000 p.s.i. and at a temperature of about 2400–3000° F. for about thirty minutes to sinter and unify the powders in accordance with powder metal principles to afford the finished friction element. Characteristically, the graphite die approximates closely the dimensions of the finished part. After the part has been sintered, it is then bonded as by pressure welding to a backing member, although other preferred arrangements may be used in this regard. In some instances, graphite or like friction modifier may be added to the composition before pressing and sintering.

Friction elements produced in this way are most conveniently tested by mounting a specimen friction element to be evaluated in a stationary holder on a dynamometer. A rotatable wear plate or opposing member representative of the opposing member of the friction couple is mounted adjacent the specimen friction element and is brought into contact therewith under predetermined conditions of speed, pressure, and a known value of inertia in accordance with standard test procedures for simulating field operation conditions. Such testing in addition to determining friction levels also serves to determine the most satisfactory kind of opposing member for the friction couple, the amount of wear to be expected, and resistance to mechanical and thermal shock.

In those instances where it is desired to produce an intermetallic friction element not including a powdered binder metal or ceramic, hot pressing as above described is performed on the comminuted intermetallic per se, but it should be stressed that a binder or a ceramic or both appear to be necessary to assure physical strength and to enhance thermal shock resistance as will be pointed out below.

The immediately following tables are tabulations of friction elements made in accordance with the present invention and found to be satisfactory over a relatively wide range of high energy levels and different operating conditions.

TABLE I

*Pure Intermetallic*

| | Intermetallic | Opposing member | Friction coefficient |
|---|---|---|---|
| (1) | NiAl | NiAl | 0.260 |
| (2) | MoAl | Mo+0.5% Ti Alloy [1] | 0.198-0.624 |
| (3) | Mo₃Al | Mo-Ti | 0.184-0.310 |
| (4) | Mo₃Al | Mo₃Al | 0.173-0.565 |

[1] Hereinafter identified as Mo-Ti.

TABLE II

*Metal-Bonded Intermetallic*

[Parts by weight]

| | Intermetallic | Bond metal | Opposing member | Friction coefficient |
|---|---|---|---|---|
| (1) | 75 NiAl | 25 Ni | Mo-Ti | 0.083-0.452 |
| (2) | 75 NiAl | 25 (Mo+4% Cr) | Mo-Ti | 0.191-0.975 |
| (3) | 75 Mo₃Al | 25 Ni | Mo-Ti | 0.187-0.492 |
| (4) | 75 Mo₃Al | 25 (Mo+4% Cr) | Mo-Ti | 0.260-0.680 |

TABLE III

*Mo₃Al Intermetallic Containing Ceramic Additive*

Mo-Ti OPPOSING MEMBER

| | Ceramic | Percent ceramic (remainder Mo₃Al) | Friction coefficient |
|---|---|---|---|
| (1) | Mullite | 2 | 0.400-0.572 |
| (2) | ...do | 8 | 0.371-0.495 |
| (3) | ...do | 20 | 0.248-0.492 |
| (4) | Alumina | 2 | 0.260-0.467 |
| (5) | ...do | 8 | 0.652 |
| (6) | ...do | 20 | 0.265-0.550 |
| (7) | Crystolon [1] | 2 | 0.268-0.584 |
| (8) | ...do | 8 | 0.300-0.495 |
| (9) | ...do | 20 | 0.454-0.600 |

[1] Cemented SiC offered by Norton Company.

It was observed that use of a binder metal materially increased the physical strength and thermal shock resistance of the nickel aluminide friction element, and like effects were observed upon addition of a ceramic to the molybdenum aluminide intermetallic. As will be apparent from Table III, addition to the intermetallic matrix of a ceramic also produced generally higher friction levels in comparison to those observed for specimen 3 of Table I. Based on this and dynamometer-observed enhancement of mechanical and thermal shock resistance achieved by nickel binder for the nickel aluminide friction element listed in Tables I and II, the effect on friction level by further addition of a ceramic was investigated. The data are set forth in Table IV below. There is an increase in friction level, but the primary advantage of ceramic addition, as was mentioned above, is enhanced thermal shock resistance, and also further resistance to wear as will be pointed out below. Graphite represents a friction modifier or lubricant for reducing harshness of friction couple engagement. The data in Table IV are as follows:

TABLE IV

*Metal-Bonded NiAl Intermetallic With Ceramic Addition*

Mo-Ti OPPOSING MEMBER

[All parts by weight]

| | NiAl intermetallic | Ni bond | Alumina | Friction coefficient |
|---|---|---|---|---|
| (1) | 55 | 25 | 20 | 0.272-0.378 |
| (2) | 30 | 50 | 20 | 0.221-0.526 |
| (3) | 45 | 35 | 20 | 0.222-0.520 |
| (4) | 60 | 20 | 20 | 0.182-0.399 |
| (5) | 70 | 10 | 20 | 0.175-0.528 |
| (6) | 50 | 25 | 25 | 0.300-0.563 |
| (7) | 42 | 21 | 27 | 0.339-0.515 |
| (8) | 58 | 29 | 13 | 0.184-0.579 |

| | NiAl | Ni bond | Alumina replaced by— | | Friction coefficient |
|---|---|---|---|---|---|
| | | | Graphite | Mullite | |
| (9) | 70 | 25 | 5 | | 0.266-0.505 |
| (10) | 65 | 25 | 5 | 5 | 0.254-0.458 |
| (11) | 55 | 25 | 10 | 10 | 0.254-0.400 |

Suitable variations of the foregoing are of course possible, but it should be stressed that for the most severe energy absorption requirements coupled with high thermal and mechanical shock as in aircraft braking, nickel bonded nickel aluminide containing ceramic emerges as the optimum intermetallic friction element. This is based on the observation that unbonded or unreinforced intermetallics begin to deteriorate physically as the most severe conditions are encountered in dynamometer testing, that nickel appears to be the best binder metal for overcoming this and producing strength enhancement and good resistance to sudden thermal shock, and that nickel aluminide is more efficiently bonded than molybdenum aluminide. Advantageously, a ceramic is added to impart additional thermal shock resistance, and, if desired, friction may be modified for optimum smooth friction couple engagement by means of graphite or like lubricant addition. It should be pointed out, however, that some circumstances, as for instance a clutch at a high temperature and low mechanical stressing, may permit use either of the intermetallic per se suitably backed by a steel plate or the like, or an unbonded intermetallic containing ceramic, in which case both nickel and molybdenum aluminide appear to be equivalent.

Five specimens each of various compositions were tested to determine the optimum nickel aluminide to nickel binder ratio from the standpoint of wear losses under operating conditions, holding the ceramic addition constant at twenty percent alumina as representative of the condition where a ceramic additive is to be used. These tests were carried out on a standard dynamometer, comparing wear and friction for each composition tested. In all tests, the molybdenum-titanium alloy wear plate was used. The test data are set forth in the graph of FIG. 1.

The composition giving the best combination of low weight and thickness loss according to FIG. 1 is that of about forty-eight percent nickel aluminide, thirty-two percent nickel, twenty percent alumina, or in other words a NiAl:Ni ratio of about 3:2. Compositions containing significantly upwards of sixty percent nickel aluminide (3:1 ratio) exhibited cracking and increased wear. Compositions with about thirty percent nickel aluminide (near 1:1 ratio) exhibited some tendency toward chatter during the stops. The one group of specimens that showed an increase in weight rather than a loss is probably accounted for by significant predominate formation of oxide inasmuch as the nickel content is at a very high level. It should be pointed out that "corrected weight loss" is actual weight loss corrected for averages and random sampling. Note that FIG. 1 can be considered a significant showing of the importance of a binder metal to the extent that wear increases rapidly at low binder levels.

As to frictional characteristics, a study of the curves in FIG. 2 shows that in general, for stops on any composition at a fixed pressure, friction decreases with increasing speed. An exception to this is the curve at 200 p.s.i., 500 r.p.m., but such is probably due to the fact that this represents commencement of the test condition for each composition and consequently the values may not be significant due to surfaces not yet being in ideal friction contact. The curves for the highest pressure (1,000 p.s.i.) show a tendency for the friction element to hold a fairly constant value of friction regardless of composition.

Addition of a ceramic to the intermetallic matrix has an advantageous effect as was mentioned. In determining the optimum amount of ceramic to be used, specimens of several different compositions were prepared and tested on a dynamometer to compare wear and friction data. In all of these tests, the above identified molybdenum-titanium alloy wear plate was again used. In this test, the nickel aluminide to nickel ratio in the several compositions was held constant at two to one, with the balance consisting of alumina in variable amounts. It was found that a minimum amount of wear occurred with a composition containing about thirty-seven percent alumina. The test data on wear, and friction at various speeds, are plotted in FIGS. 3 and 4 respectively.

It will be observed from the curves of FIG. 3 that as the amount of ceramic is decreased significantly higher wear rates occur, and it was observed further that there was some prevalence of chatter and decrease in structural strength. The rather wide swing in the curves of FIG. 3 at the 62—31—7 point apparently represents an error in the test, because the general straight line increase in wear is reestablished at the 67—33—0 point. As to friction, the general tendency is for increasing amounts of ceramic somewhat to raise the coefficient of friction at a given speed and pressure.

The foregoing friction and wear data were compiled from standard dynamometer testings, and the following kinetic energies were developed at the speeds indicated. Estimated temperatures were in excess of 2000° F.:

TABLE V

| R.p.m.: | Kinetic energy (inch-pounds) |
|---|---|
| 500 | 10,500 |
| 1000 | 43,500 |
| 2000 | 172,000 |
| 3600 | 560,000 |

To compare the ability of intermetallic friction elements to absorb energy at high levels in comparison to bronze-base powdered metal friction elements representative of approved and installed powdered metal friction element compositions for aircraft brakes, a comparative dynamometer test was made. In this instance, the friction elements compared were powdered metal ring-shape segments on a backing member which is a common example of powdered metal friction element structure. The intermetallic tested was one composed of seventy-five percent nickel aluminide, twenty-five percent nickel binder. The bronze-base material was composed primarily of powdered copper and tin pressed and sintered in the usual fashion. The dynamometer schedule for this comparison was as follows:

(a) 200 p.s.i.: One stop each at 500, 1000 and 2000 r.p.m. Repeat.
(b) 500 p.s.i.: Repeat 200 p.s.i. procedure followed by ten stops at 3600 r.p.m.
(c) 1000 p.s.i.: Repeat 200 p.s.i. procedure.
(d) 2000 p.s.i.: Repeat 200 p.s.i. procedure.

After the ninth stop in step b at 3600 r.p.m., the bronze-base material was destroyed to such an extent that further testing was impossible. The total energy absorbed to this point was about $5.9 \times 10^6$ inch-pounds. Up to this stage, the intermetallic friction element showed insignificant wear, and the test on the intermetallic was carried further as follows:

(e) 500 p.s.i.—fifty stops at 3600 r.p.m.
(f) 600 p.s.i.—eight stops at 3600 r.p.m.
(g) 1000 p.s.i.—three stops at 3600 r.p.m.

After the third stop in step g the test was arbitrarily terminated where the total energy absorbed by the intermetallic was $42.3 \times 10^6$, or in other words about seven times that of the commercial bronze-base material at the time of destruction.

PHYSICAL PROPERTIES

The physical properties and characteristics of fifty-five percent nickel aluminide (NiAl) bonded with twenty-five percent nickel and containing twenty percent alumina are as follows:

Modulus of elasticity (2000° F.) ___ 12 to $19 \times 10^6$.
Transverse strength (2000° F.) ___ 4.6 to $5.9 \times 10^3$ p.s.i.
Oxidation resistance ___ 2.35% weight gain at 1.2% porosity; 4.37% weight gain at 2.8% porosity.
Coefficient of expansion (20-1000° C.) ___ $15.2 \times 10^{-6}$.
Thermal shock resistance ___ 3 cycles to failure at 8% porosity; 12 cycles to failure at 3.9% porosity.
Impact strength ___ 1.12–3.62 inch pounds.
Thermal conductivity ___ 17.8 B.t.u./ft.²/hr./° F./ft.

Oxidation resistance was determined by heating a specimen in a stagnant oxidizing atmosphere at a constant temperature of about 1930° F. for 48 hours. Porosity in a powdered metal part of the kind under consideration is of course a measure of density, and as would be expected the more dense speciment showed the greater oxidation resistance.

Resistance to thermal shock was determined by the usual heating and quenching method. After 20–30 minutes at 2000° F., a specimen was quickly water quenched, and such cycle was repeated until failure occurred. Failure was considered the condition when a specimen could be easily parted manually along a crack line.

Insofar as a complete friction couple is concerned, the member that works in opposition to the member having an intermetallic friction element is also of importance in view of the extreme energy conditions under consideration. I have found that the molybdenum-titanium alloy mentioned above (molybdenum+0.5% titanium) is satisfactory irrespective of the kind of intermetallic; especially from the standpoint of uniform high friction levels at all speeds and less wear rate of the opposing member. However, a heat resistant steel alloy such as Timken 1722AS steel appears to be capable of use under less exacting conditions. Moreover, the wear plate can be advantageously faced with the same intermetallic as the friction element itself as shown in Table I.

It will be seen from the foregoing that the present invention makes possible the accommodation of high energy braking and like frictional engagements by utilization of a corresponding friction element composed of at least primarily in part of powdered intermetallic material, pressed and fused or sintered. Desirably for particularly high energy levels the powdered intermetallic is combined with a metal binder or ceramic or both to enhance resistance to mechanical and thermal shock. Such ceramics fall into a broad class including hard, refractory nitrides, carbides, oxides and silicates which by their physical or mechanical characteristics rather than any chemical phenomena impart higher resistance levels to the intermetallic per se. The present invention thus affords a wide variety of possibilities in composing an intermetallic or wear part for variant conditions and uses to the extent that in some instances the intermetallic per se may be found to be satisfactory, whereas in other instances use of a binder or ceramic or both are required to satisfy more extreme thermal and mechanical conditions. Typical of a general type of friction couple contemplated for friction elements of the present invention is that shown schematically in FIGS. 5 and 5A. The friction elements in this example, composed of an intermetallic, are shown in the form of buttons which were the form of friction elements tested in assembling the data in the above tables, and these are adapted to be carried on a stationary disc part or stator. Alternatively, the friction elements may be in the form of segments or a complete ring secured to the stator, and in any event the friction elements are preferably pressure welded to the stator which is advantageously nickel plated steel. One such stator is advantageously arranged on the opposite sides of the rotating part or rotor that is to be decelerated by bringing about forced pressure engagement between the friction element and the rotor in the usual fashion as by hydraulic means.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A rigid self-sustaining friction element wear part having at least a wear face comprised of sintered powdered intermetallic material selected from the group consisting of nickel aluminide and molybdenum aluminide as the essential ingredient, a binder metal of nickel bonding together the sintered intermetallic powder, and said friction element wear part including finely divided alumina.

2. A friction couple comprising a stator member and a rotor member adapted to be coupled together, one such member having thereon a friction element having at least a wear face comprising sintered powdered intermetallic material selected from the group consisting of nickel aluminide and molybdenum aluminide.

3. A friction couple according to claim 2 wherein the intermetallic is bonded by a binder metal of nickel.

4. A friction couple according to claim 2 wherein the wear face additionally includes a ceramic.

5. A wear part according to claim 1 wherein the intermetallic:binder ratio is about 3:2, but is not more than about 3:1, nor less than about 1:1.

6. A friction couple according to claim 3 wherein the intermetallic:binder ratio by weight is about 3:2, but is not more than about 3:1, nor less than about 1:1.

7. A rigid self-sustaining friction element wear part having at least the wear face thereof composed primarily of sintered powdered intermetallic material selected from the group consisting of nickel aluminide and molybdenum aluminide, said intermetallic powders being permanently and rigidly bonded by powdered and sintered uncombined nickel metal.

References Cited in the file of this patent

UNITED STATES PATENTS

| | | |
|---|---|---|
| 2,251,410 | Koehring et al. | Aug. 5, 1941 |
| 2,751,668 | Turner et al. | June 26, 1956 |